(12) United States Patent
Koskinen et al.

(10) Patent No.: US 12,052,250 B2
(45) Date of Patent: Jul. 30, 2024

(54) NETWORK COMMISSIONING OF TRANSPORTATION INFRASTRUCTURE PERIPHERAL DEVICES

(71) Applicant: KONE Corporation, Helsinki (FI)

(72) Inventors: Santtu Koskinen, Helsinki (FI); Mikko Piironen, Helsinki (FI); Ari Koivisto, Helsinki (FI); Mikko Mattila, Helsinki (FI); Anssi Rantamäki, Helsinki (FI); Mikko Heiskanen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 552 days.

(21) Appl. No.: 17/217,202

(22) Filed: Mar. 30, 2021

(65) Prior Publication Data

US 2021/0218746 A1   Jul. 15, 2021

Related U.S. Application Data

(63) Continuation of application No. PCT/FI2018/050743, filed on Oct. 16, 2018.

(51) Int. Cl.
| | |
|---|---|
| H04L 9/40 | (2022.01) |
| B66B 1/34 | (2006.01) |
| B66B 25/00 | (2006.01) |
| H04L 41/12 | (2022.01) |
| H04L 67/12 | (2022.01) |

(52) U.S. Cl.
CPC ............ H04L 63/10 (2013.01); B66B 1/3453 (2013.01); B66B 25/003 (2013.01); H04L 41/12 (2013.01); H04L 67/12 (2013.01)

(58) Field of Classification Search
CPC ................................. H04L 63/10; H04L 67/12
See application file for complete search history.

(56) References Cited

U.S. PATENT DOCUMENTS

| | | | |
|---|---|---|---|
| 6,216,172 B1 | 4/2001 | Kölblin et al. | |
| 8,891,423 B2 | 11/2014 | Shaheen et al. | |
| 8,930,506 B2 | 1/2015 | Nguyen et al. | |
| 9,210,150 B2 * | 12/2015 | Grim | H04W 12/06 |

(Continued)

FOREIGN PATENT DOCUMENTS

| | | |
|---|---|---|
| CN | 102598757 A | 7/2012 |
| CN | 103647782 B | 2/2017 |

(Continued)

OTHER PUBLICATIONS

U.S. Appl. No. 17/205,477, filed Mar. 18, 2021.

(Continued)

*Primary Examiner* — Viral S Lakhia

(74) *Attorney, Agent, or Firm* — Birch, Stewart, Kolasch & Birch, LLP

(57) ABSTRACT

Commissioning of a transportation infrastructure peripheral device in a transportation infrastructure control network is disclosed. In the arrangement a peripheral device is attached to a transportation infrastructure control network through a network element or directly to a controller. When the connection has been made, a process for identifying and granting appropriate access rights is initiated. As a result, common network technologies can be used for transmitting information that is critical for elevator operation.

18 Claims, 4 Drawing Sheets

(56) References Cited

U.S. PATENT DOCUMENTS

| | | | |
|---|---|---|---|
| 9,537,808 | B1 | 1/2017 | Giansiracusa et al. |
| 9,674,669 | B2* | 6/2017 | Subramanian ........ H04W 4/024 |
| 10,154,021 | B1* | 12/2018 | Lerner ...................... H04L 9/32 |
| 10,225,242 | B2* | 3/2019 | Grim ...................... H04W 12/06 |
| 10,545,026 | B1* | 1/2020 | Schaefer ............ G01C 21/3476 |
| 10,691,779 | B2* | 6/2020 | Ginsberg ............ H04L 63/0807 |
| 11,097,923 | B2* | 8/2021 | Eleid ...................... B66B 1/3461 |
| 11,099,526 | B2* | 8/2021 | Wenzel ...................... G05F 1/66 |
| 11,119,453 | B2* | 9/2021 | Koshy ................ G05B 23/0259 |
| 11,601,396 | B2* | 3/2023 | Koskinen ............ H04L 61/5014 |
| 2004/0152448 | A1 | 8/2004 | Passi |
| 2009/0022131 | A1 | 1/2009 | Rusanen et al. |
| 2012/0066356 | A1* | 3/2012 | Nguyen .................. H04L 67/12 709/220 |
| 2012/0145487 | A1* | 6/2012 | Yoo ....................... B66B 1/3453 187/380 |
| 2014/0045479 | A1 | 2/2014 | Shinada et al. |
| 2016/0337181 | A1 | 11/2016 | Cathrow et al. |
| 2018/0099840 | A1* | 4/2018 | Armistead ........... G05B 19/042 |
| 2022/0191092 | A1* | 6/2022 | Luscher ................ H04L 41/082 |

FOREIGN PATENT DOCUMENTS

| | | | |
|---|---|---|---|
| EP | 2 258 649 | A1 | 12/2010 |
| EP | 2587725 | A1 | 5/2013 |
| EP | 3 318 523 | A1 | 5/2018 |
| EP | 3 062 541 | A1 | 8/2018 |
| EP | 3 381 851 | A2 | 10/2018 |
| EP | 3 381 862 | A2 | 10/2018 |
| WO | WO 2007/061405 | A2 | 5/2007 |
| WO | WO 2007/093665 | A1 | 8/2007 |
| WO | WO 2010/087815 | A1 | 8/2010 |
| WO | WO 2012/118711 | A2 | 9/2012 |
| WO | WO 2014/122357 | A1 | 8/2014 |
| WO | WO 2015/084396 | A1 | 6/2015 |
| WO | WO 2015/177020 | A1 | 11/2015 |
| WO | WO 2018/050654 | A1 | 3/2018 |

OTHER PUBLICATIONS

U.S. Appl. No. 17/205,500, filed Mar. 18, 2021.
U.S. Appl. No. 17/205,572, filed Mar. 18, 2021.
U.S. Appl. No. 17/215,772, filed Mar. 29, 2021.
U.S. Appl. No. 17/215,549, filed Mar. 29, 2021.
U.S. Appl. No. 17/215,930, filed Mar. 29, 2021.
U.S. Appl. No. 17/217,272, filed Mar. 30, 2021.
Chinese Office Action dated Mar. 31, 2023 for Application No. 201880098777.2 with an English translation.
Cisco, "Connected Rail Solution Design Guide," URL: https://www.cisco.com/c/dam/en_us/solutions/industries/docs/cts-dg.pdf, Nov. 2016, XP055613499, 42 pages total.
Cisco, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.
International Search Report for International Application No. PCT/EP2018/078149, dated Mar. 28, 2019.
International Search Report for International Application No. PCT/FI2018/050742, dated Jul. 18, 2019.
International Search Report for International Application No. PCT/FI2018/050743, dated Jul. 5, 2019.
International Search Report for International Application No. PCT/FI2018/050744, dated Sep. 4, 2019.
International Search Report for International Application No. PCT/FI2018/050745, dated Jul. 8, 2019.
International Search Report for International Application No. PCT/FI2018/050746, dated Sep. 24, 2019.
International Search Report for International Application No. PCT/FI2018/050747, dated Jul. 8, 2019.
International Search Report for International Application No. PCT/FI2018/050748, dated Jul. 5, 2019.
Written Opinion of the International Searching Authority for International Application No. PCT/EP2018/078149, dated Mar. 28, 2019.
Written Opinion of the International Searching Authority for International Application No. PCT/FI2018/050742, dated Jul. 18, 2019.
Written Opinion of the International Searching Authority for International Application No. PCT/FI2018/050743, dated Jul. 5, 2019.
Written Opinion of the International Searching Authority for International Application No. PCT/FI2018/050744, dated Sep. 4, 2019.
Written Opinion of the International Searching Authority for International Application No. PCT/FI2018/050745, dated Jul. 8, 2019.
Written Opinion of the International Searching Authority for International Application No. PCT/FI2018/050746, dated Sep. 24, 2019.
Written Opinion of the International Searching Authority for International Application No. PCT/FI2018/050747, dated Jul. 8, 2019.
Written Opinion of the International Searching Authority for International Application No. PCT/FI2018/050748, dated Jul. 5, 2019.

* cited by examiner

NETWORK COMMISSIONING OF TRANSPORTATION INFRASTRUCTURE PERIPHERAL DEVICES

CROSS REFERENCE TO RELATED APPLICATIONS

This application is a Continuation of PCT International Application No. PCT/FI2018/050743, filed on Oct. 16, 2018, which is hereby expressly incorporated by reference into the present application.

DESCRIPTION OF BACKGROUND

The following description relates to transportation infrastructure, such as elevators and escalators. More particularly the description relates to commissioning of peripheral devices in a transportation infrastructure control network.

Modern elevators are network connected devices that can be accessing resources from one or more external entities providing services to elevators and escalators for the benefit of passengers. In addition to the improvement of passenger comfort and efficiency, the network connectivity may be used for several other purposes, for example entertainment or data collection.

A common approach for providing network connectivity is to use specially designed dedicated network technologies that are configured to reliably and timely provide safety and elevator control related messages to the receiving network components. In many occasions these special purpose dedicated networks use technologies that are compatible with old cables and old technology of elevators. Special purpose dedicated networks have been easy to configure and maintain. Thus, they have been preferred solutions and under continuous development.

Nowadays the network connectivity does not only relate to external devices connected to an elevator system. Even some components that are relevant or even essential for normal operation of an elevator or escalator group can be connected using data communication networks.

In this description, these components are referred to as applications. The applications may be implemented as hardware or software. Many applications involving hardware also include software, and software applications may be executed in a server or central computing resource. Thus, an application can be described as an entity providing services to requesting clients. An example of an application is a group controller. An example of a client is a destination operating panel installed in an elevator arrangement.

Current elevators use a network arrangement that is in this description referred to as a transportation infrastructure control network (TICN). A TICN can be a combination of wired and wireless network solutions.

The TICN is used for connecting elevator and escalator and other transportation infrastructure components together. Particularly, they are used for connecting Elevator Escalator Peripheral Devices (EEPD) to the elevator arrangement. When new peripheral devices, which are here discussed as an example of client entities, are added to the elevator or escalator arrangement, the peripheral devices must be detected and connected to the network appropriately. The same applies when already existing peripheral devices need to be disconnected and then reconnected to the arrangement. Further needs may arise from other possible reorganizing related tasks.

Even if the TICN is most commonly used for data communications related to elevators and escalators, it can also be used for controlling, for example, access gates, display panels and the like. It is not necessary that the TICN is coupled with elevators and escalators, and the TICN can be used, for example, for access gates only. In this application the TICN is understood to be a separate physical network originally designed for transportation infrastructure purposes only.

As discussed above, attaching peripheral devices and other devices to a TICN may require a complicated configuration process. Conventionally, the configuration process has been made easier by using pre-configured devices; however, in modern elevator arrangements this is a difficult task as the elevator system may be a part of a building network that is complicated and continuously changed. Furthermore, these devices are commonly installed in spaces with limited access. An example of such limited space is the elevator shaft. Typically, working in elevator shafts requires a special qualification for elevator environment.

SUMMARY

In the following description, a mechanism for commissioning of an elevator and escalator peripheral device in a transportation infrastructure control network is disclosed. In the arrangement a peripheral device is attached to a transportation infrastructure control through a network element or directly to a controller. When the connection has been made, a process for identifying and granting appropriate access rights is initiated. As a result, common network technologies can be used for transmitting information that is critical for elevator operation.

In an aspect a method for commissioning transportation infrastructure peripheral devices in a transportation infrastructure control network is disclosed. The method comprises: receiving an identity request at an elevator and escalator peripheral device from a network element; responding to the received identity request; receiving at an elevator and escalator peripheral device an access challenge from a network element; responding to the received access challenge; and receiving at an elevator and escalator peripheral device an access granted message.

According to the aspect it is possible to add elevator and escalator peripheral devices to a transportation infrastructure control without a need for pre-configuration or on-site configuration. Furthermore, the method may be used for reconfiguring devices in a transportation infrastructure control network when one or more peripheral devices, network elements or other components in the transportation infrastructure control network have been changed. The change may be change of a whole device or configuration of a device.

In an implementation the method further comprises transmitting a service request to a service resource. After configuration, the elevator and escalator peripheral device can send service requests to service resources, such as the application mentioned above, and receive responses for the service requests.

In an aspect a method for commissioning elevator and escalator peripheral devices in a transportation infrastructure control network is disclosed. The method comprises determining identity of an elevator and escalator peripheral device; performing an access challenge request for elevator and escalator peripheral device; and providing an access to the transportation infrastructure control network.

According to the aspect it is possible to add elevator and escalator peripheral devices to a transportation infrastructure control network without a need for pre-configuration or on-site configuration.

In an implementation a method for commissioning transportation infrastructure peripheral devices in a transportation infrastructure control network is disclosed. The method comprises: transmitting an identity request to an elevator and escalator peripheral device; receiving a response to the transmitted identity request; transmitting the received response to a transportation infrastructure control network controller; receiving an access challenge request from the transportation infrastructure control network controller; transmitting the received challenge request to the elevator and escalator peripheral device; receiving a response to the challenge request from the elevator and escalator peripheral device; transmitting the received response to the challenge request to the transportation infrastructure control network controller; receiving an access granted message from the transportation infrastructure control network controller; and transmitting the received access granted message to the elevator and escalator peripheral device.

According to the implementation it is possible to add elevator and escalator peripheral devices to a transportation infrastructure control network without a need for pre-configuration or on-site configuration. Furthermore, the method may be used for reconfiguring devices in a transportation infrastructure control network when one or more peripheral devices, network elements or other components in the transportation infrastructure control network have been changed. The change may be change of a whole device or configuration of a device.

In an implementation the method further comprises: receiving a request for a service from the transportation infrastructure control network peripheral device; transmitting the received request to the transportation infrastructure control network controller; receiving a service response from the transportation infrastructure control network controller; and transmitting the service response to the transportation infrastructure control network peripheral device. After configuration, the elevator and escalator peripheral device can send service requests to service resources, such as the application mentioned above, and receive responses for the service requests.

In an aspect a computer program comprising computer executable computer program code, wherein the computer program code is configured to perform a method described above when the computer program is executed in a computing device, is disclosed.

In an aspect an elevator and escalator peripheral device is disclosed. The elevator and escalator peripheral device comprises at least one processor (27) configured to execute computer program code; at least one memory (28) configured to store computer program code and related data; and at least one network connection (29) configured to connect the elevator peripheral device to a data communications network. The elevator peripheral device is configured to perform a method as described above.

In an implementation the elevator and escalator peripheral device according to the aspect is one of the following: a destination operation panel, a speaker, a display, a media screen and a device requiring authentication. The process described above is particularly useful for devices that require authentication and appropriate access right management for accessing services in the transportation infrastructure control network In an aspect a transportation infrastructure control network element is disclosed. The transportation infrastructure control network element comprises: at least one processor (24) configured to execute computer program code; at least one memory (25) configured to store computer program code and related data; and at least one network connection (26) configured to connect the elevator peripheral device to a data communications network. The elevator peripheral device is configured to perform a method described above.

In an aspect an elevator system is disclosed. The elevator system comprises at least one elevator connected to a transportation infrastructure control network;
at least one elevator peripheral device as described above, wherein the peripheral device is configured to transmit queries using a transportation infrastructure control network and at least one network element as described above, wherein the network element is configured to route data communications between the elevator peripheral device and a transportation infrastructure control network controller. The at least one elevator in the elevator system comprises common elevator components, such as a hoisting machine, ropes and the like, an elevator control system and the like, that may be connected to the transportation infrastructure control network directly or through additional control components.

The methods, devices and systems disclosed above provide an efficient way of attaching new devices to a transportation infrastructure control network. The person attaching the devices to the transportation infrastructure control network does not necessarily need additional information or skills, and thus a mechanic having qualifications for shaft-side work may install the new components. A further benefit of the arrangements disclosed above is that it is possible use the same principles when changing a device in the elevator system, for example because of a break-down, update or scheduled maintenance change.

BRIEF DESCRIPTION OF THE DRAWINGS

The accompanying drawings, which are included to provide a further understanding of the network commissioning of elevator and escalator peripheral devices and constitute a part of this specification, illustrate example embodiments and together with the description help to explain the principles of the network commissioning of elevator and escalator peripheral devices. In the drawings.

DETAILED DESCRIPTION

Reference will now be made in detail to the embodiments, examples of which are illustrated in the accompanying drawings.

In the following description, an elevator is used as an example. The arrangement is also suitable for escalators and systems comprising both elevators and escalators.

Figure 1:
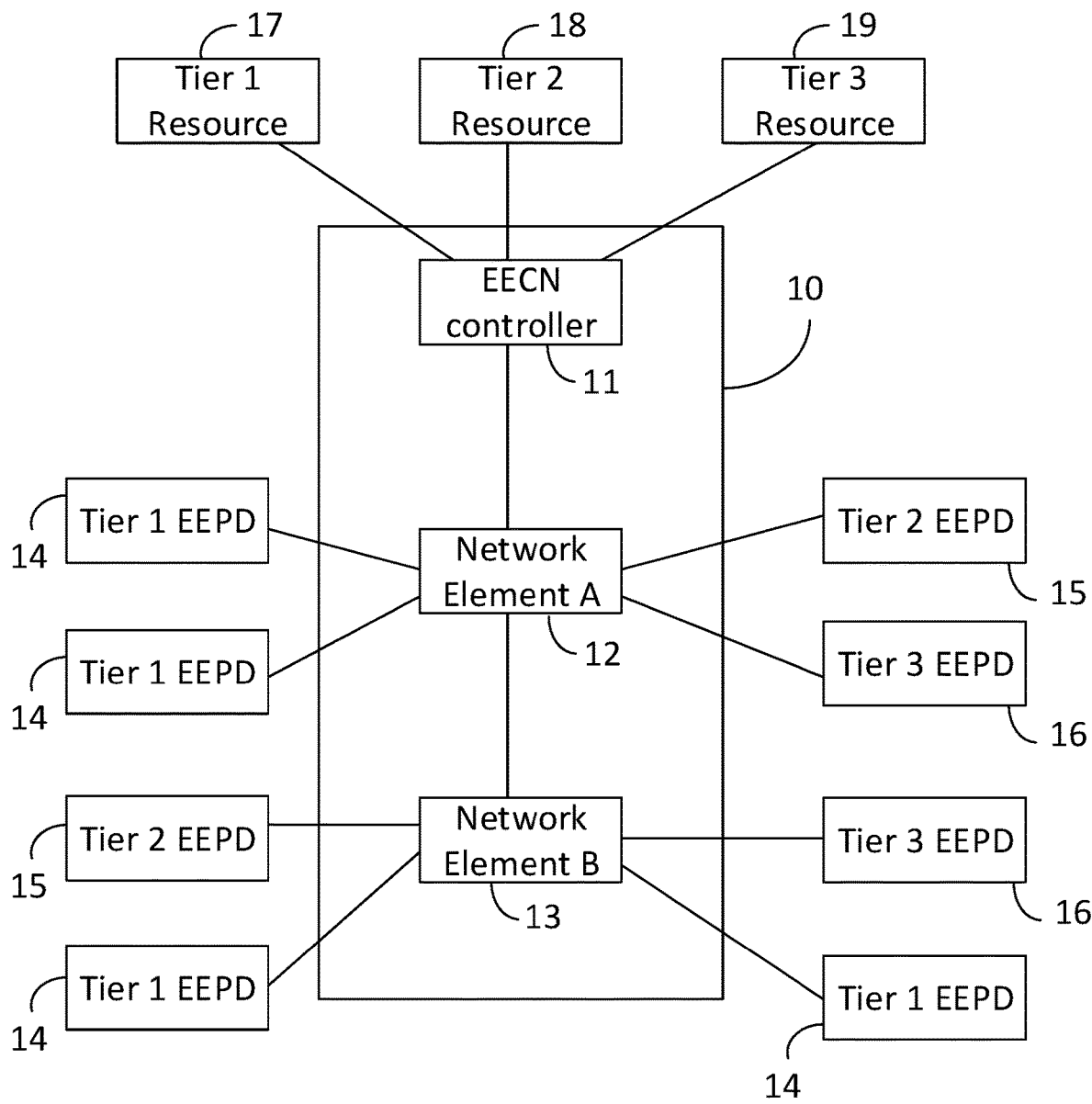
FIG. 1 is a block diagram of an example transportation infrastructure control network.

In FIG. 1 a block diagram of an example transportation infrastructure control network is shown. The example of FIG. 1 is provided for better understanding of the general working environment of the network commissioning of elevator and escalator peripheral devices.

In the system, a transportation infrastructure control network TICN 10 is shown. The TICN is a network capable of connecting various devices together. The connected devices can be computing devices, modern internet connectable devices, internet of things devices or similar devices. The network may be implemented using Ethernet, which is a common network technology. The TICN may be supplemented using other wired or wireless network connections, such as mobile communication networks, wireless local area networks or the like. Typically, the used network technologies are chosen from network technologies that are implemented at the site for other purposes. As Ethernet is currently the dominating technology, in the following description the use of Ethernet is assumed.

In FIG. 1 the TICN 10 further comprises a TICN controller 11, which is configured to control the TICN and in the present example also to act as a gateway to external devices. The gateway functionality need not necessarily be in the same component. The TICN 10 further comprises network element A 12 and network element B 13. Network elements A and B can be special purpose devices or devices that are typical to the network technology used. For example, in case of Ethernet, the common Ethernet and internet technologies can be used. Thus, network elements A and B can be common switches, bridges, VPN-devices or similar devices that are connected to each other or directly to the TICN controller 11.

In FIG. 1 a plurality of elevator and escalator peripheral devices 14-16 are connected to network elements A and B. The peripheral devices belong to different tiers. The elevator and escalator peripheral devices 14-16 are also known as clients that are requesting services from applications. In the example of FIG. 1, four tier 1 devices 14, two tier 2 devices 15, and two tier 3 devices 16 are shown. In FIG. 1, three resources 17-19 belonging to different tiers are shown. The resources shown in FIG. 1 are also known as applications that are providing services to requesting clients.

Different tier levels are determined according to the elevator or escalator installation. One example of such arrangement is that Tier 1 network represents a critical network for lift operation, for example signalization. Tier 2 network represents a manufacturer network where lift manufacturer media/sensoring devices communicate with, for example, lift manufacturer cloud services. Tier 3 network represents a partner network where partner devices communicate with partner resources. Logical separation of the tiers in the network can be done, for example, using a VLAN. The number of tiers is not limited to three but can vary on the basis of the installation.

Figure 2:
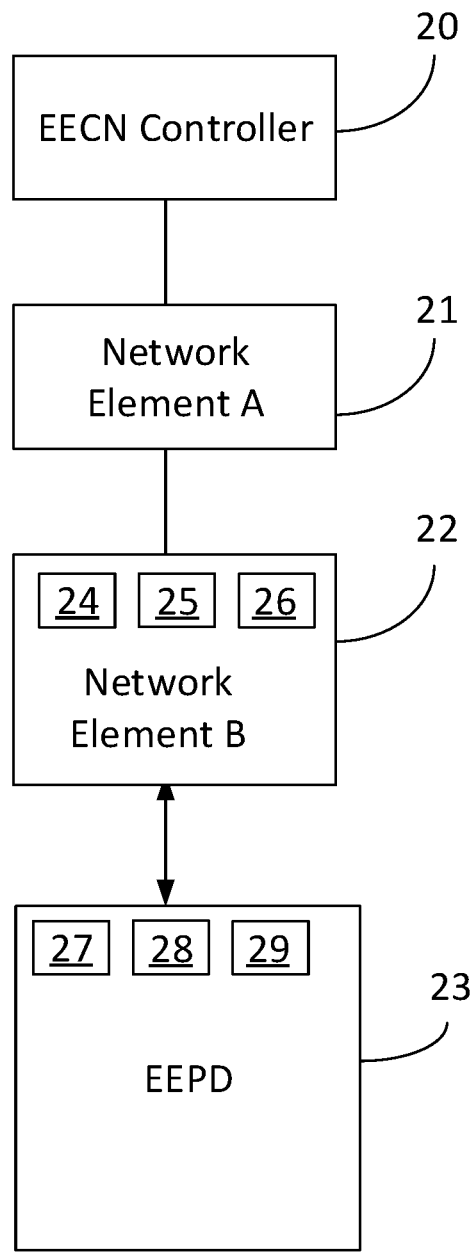
FIG. 2 is a block diagram of an example transportation infrastructure control network, wherein the transportation infrastructure control network peripheral device is being connected to a network element.

In FIG. 2, an example is shown illustrating a situation wherein an EEPD 23 is joining a TICN by connecting to a TICN controller 20 over network element A 21 and network element B 22. In FIG. 2, network element B 22 is shown in more detail, and it further comprises at least one processor 24, at least one memory and at least one network interface 26. Correspondingly, the EEPD 23 further comprises at least one processor 27, at least one memory 28 and at least one network interface 29.

When the EEPD is connected to network element B 22, the network processor 24 of network element B 22 is configured to determine the identity of the joining peripheral device 23. The at least one memory 25 of network element B comprises computer program code and relevant data that are executed by the processor 24 for performing the identity determination of the EEPD 23 that has been connected to network element B 22 using the network interface 26.

Correspondingly, the network processor 27 of the EEPD 23 is configured to provide a response to the identity determining request. The at least one memory 28 of the EEPD 23 comprises computer program code and relevant data that are executed by the processor 27 for performing the identity determination of the EEPD 23 that has been connected to network element B 22 using the network interface 29.

Figure 3:
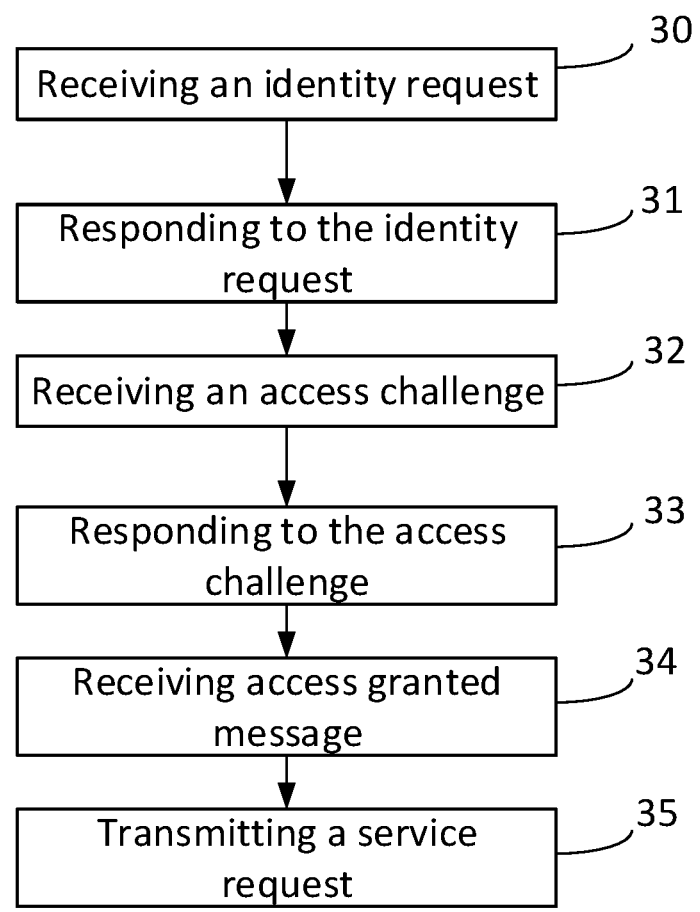
FIG. 3 is a flow chart of an example method of the present transportation infrastructure control network commissioning arrangement.

FIG. 3 discloses a method explaining the present transportation infrastructure control network commissioning arrangement. While the method of FIG. 3 is explained from an EEPD point of view, a person skilled in the art will also understand how it is applied in a network element. The signaling example of FIG. 4 may be used to support the understanding of how the method is applied in a network element.

When the EEPD is connected to a TICN, it first receives an identity request from a network element, step 30. In some implementations identity requests are implemented together with an authentication server/service. For example, it is possible that the network element provides only an initial request for starting the process and an authentication service is involved with the rest of the identity check. The implementation of an identity request as whole may involve several subsignals that are changed between the identity service and the EEPD through a network element. The EEPD responds to the network element, such as network element A or B of FIG. 1 or 2, step 31. The response comprises at least the identity of the EEPD. After the response has been sent, the EEPD receives an access challenge, step 32. The access challenge comprises an authentication related challenge. In addition to the access challenge as such, the challenge message may also comprise other information, for example with regard to encryption of the connection. The EEPD responds to the network element, step 33. As a response to the access response, the EEPD will receive an access granted or denied message, step 34. Finally, the EEPD can transmit actual service requests, step 35.

The method of FIG. 3 discloses the method from an EEPD point of view, wherein the EEPD only communicates with a network element closest to the EEPD. The network element is acting as a middle device, and it distributes the requests to the correct entity, such as the TICN controller and respective resources or applications.

In typical implementations of the method discussed with regard FIG. 3, after the peripheral devices have been granted access to the network, typically the network element or network elements, to which peripheral devices are connected to receive dynamic configuration from the authentication service. Configuration can be, for example, setting of the connecting peripheral device to a certain logical network segment. The same applies with all other settings that may be necessary for the overall network operability and that need to be applied in the network elements participating to the communication.

Figure 4:
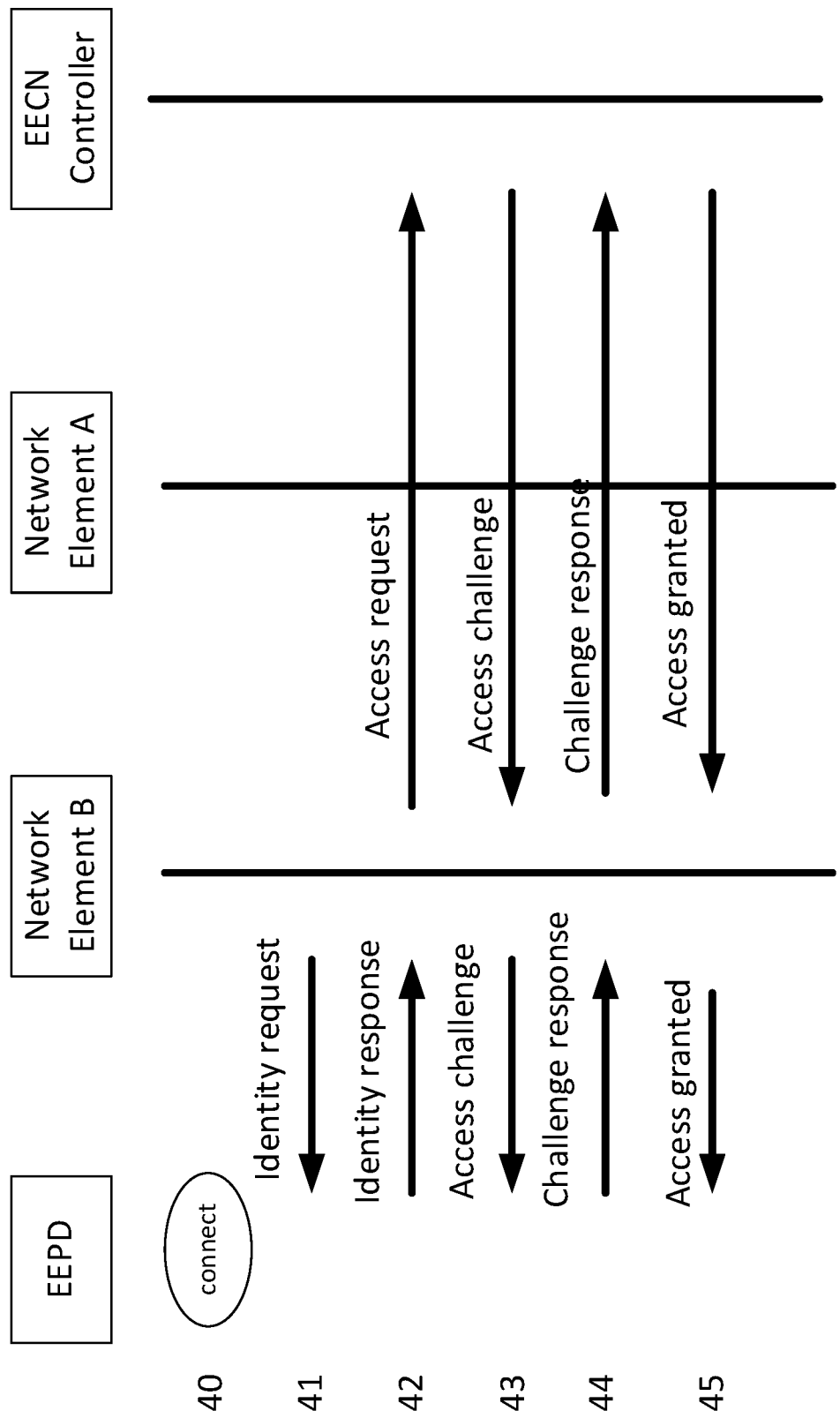
FIG. 4 is a signaling chart of an example method of the present transportation infrastructure control network commissioning arrangement.

In FIG. 4, a signaling chart is disclosed. The signaling chart shows rows 40-45 from the network element B point of view. Network element B is similar to network element B of FIGS. 1 and 2, and is connected to a TICN controller through network element A.

When network element B detects that an EEPD has been connected, row 40, to the network element, it issues an identity request, row 41. The EEPD responds to the identity requests, and network element B receives an identity response. After receiving the identity response, network element B transmits an access request to the TICN controller, row 42, to which network element B is logically connected. This may happen over one or more network elements, such as network element A shown in the figure.

As a response to the access request the TICN controller issues an access challenge. The access challenge is received at network element B and then transmitted further to the EEPD, row 43. The EEPD generates a response to the challenge and transmits it to network element B. Network element B transmits it further to the TICN, row 44. If the response to the challenge is correct, the TICN controller transmits an access granted message to network element B, which transmits it to the EEPD, row 45.

The above described methods may be implemented as computer software which is executed in a computing device that can be connected to the network used for carrying the TICN. When the software is executed in a computing device it is configured to perform the above described inventive method. The software is embodied on a computer readable medium, so that it can be provided to the computing device, such as the EEPD or network elements A or B of FIGS. 1 and 2.

As stated above, the components of the exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the network commissioning of elevator and escalator peripheral devices may be implemented in various ways. The network commissioning of elevator and escalator peripheral devices and its embodiments are thus not limited to the examples described above; instead they may vary within the scope of the claims.

The invention claimed is:

1. A method for commissioning transportation infrastructure devices in a transportation infrastructure control network, which method comprises:
   receiving an identity request at an elevator and escalator peripheral device from a network element;
   responding to the received identity request, wherein the responding comprises transmitting identity of the elevator and escalator peripheral device;
   receiving at the elevator and escalator peripheral device an access challenge from a network element;
   responding, by the elevator and escalator peripheral device, to the received access challenge;
   receiving at the elevator and escalator peripheral device, an access granted message; and
   connecting the elevator and escalator peripheral device to the transportation infrastructure control network,
   wherein the elevator and escalator peripheral device is among a plurality of elevator and escalator peripheral devices,
   wherein the plurality of elevator and escalator peripheral devices include at least one peripherical device belonging to a tier one network, at least one peripherical device belonging to a tier two network and at least one peripherical device belonging to a tier three network, and
   wherein the tier one network represents a critical network for lift operation, the tier two network represents a manufacturer network communicating with lift manufacturer sensor devices and the tier three network represents a partner network where partner devices communicate with partner resources.

2. The method according to claim 1, wherein the method further comprises transmitting a service request to a service resource.

3. A method for commissioning transportation infrastructure peripheral devices in a transportation infrastructure control network, which method comprises:
   transmitting an identity request to an elevator and escalator peripheral device;
   receiving a response to the transmitted identity request;
   performing an access challenge request for elevator and escalator peripheral device; and
   providing access of the elevator and escalator peripheral device to the transportation infrastructure control network,
   wherein the elevator and escalator peripheral device is among a plurality of elevator and escalator peripheral devices,
   wherein the plurality of elevator and escalator peripheral devices include at least one peripherical device belonging to a tier one network, at least one peripherical device belonging to a tier two network and at least one peripherical device belonging to a tier three network, and
   wherein the tier one network represents a critical network for lift operation, the tier two network represents a manufacturer network communicating with lift manufacturer sensor devices and the tier three network represents a partner network where partner devices communicate with partner resources.

4. The method according to claim 3, wherein said determining,
   performing and providing further comprises:
   transmitting an identity request to an elevator and escalator peripheral device;
   receiving a response to the transmitted identity request;
   transmitting the received response to a transportation infrastructure control network controller;
   receiving an access challenge request from the transportation infrastructure control network controller;
   transmitting the received challenge request to the elevator and escalator peripheral device;
   receiving a response to the challenge request from the elevator and escalator peripheral device;
   transmitting the received response to the challenge request to the transportation infrastructure control network controller;
   receiving an access granted message from the transportation infrastructure control network controller; and
   transmitting the received access granted message to the elevator and escalator peripheral device.

5. The method according to claim 4, wherein the method further comprises:

receiving a request for a service from the transportation infrastructure control network peripheral device;

transmitting the received request to the transportation infrastructure control network controller;

receiving a service response from the transportation infrastructure control network controller; and transmitting the service response to the transportation infrastructure control network peripheral device.

6. A computer program embodied on a non-transitory computer readable medium and comprising computer executable computer program code, wherein the computer program code is configured to perform a method according to claim 1 when the computer program is executed in a computing device.

7. An elevator and escalator peripheral device comprising:
at least one processor configured to execute computer program code;
at least one memory configured to store computer program code and related data; and
at least one network connection configured to connect the elevator peripheral device to a data communications network,
wherein the elevator peripheral device is configured to perform the method according to claim 1.

8. The elevator and escalator peripheral device according to claim 7, wherein the peripheral device is one of the following: a destination operation panel, a speaker, a display, a media screen and a device requiring authentication.

9. A transportation infrastructure control network element comprising:
at least one processor configured to execute computer program code;
at least one memory configured to store computer program code and related data; and
at least one network connection configured to connect the elevator peripheral device to a data communications network, wherein
the elevator peripheral device is configured to perform the method according to claim 3.

10. An elevator system comprising:
at least one elevator connected to a transportation infrastructure control network;
at least one elevator peripheral device according to claim 7, wherein the peripheral device is configured to transmit queries using a transportation infrastructure control network; and
at least one network element, wherein the network element is configured to route data communications between the elevator peripheral device and a transportation infrastructure control network controller.

11. A computer program embodied on a non-transitory computer readable medium and comprising computer executable computer program code, wherein the computer program code is configured to perform the method according to claim 2 when the computer program is executed in a computing device.

12. A computer program embodied on a non-transitory computer readable medium and comprising computer executable computer program code, wherein the computer program code is configured to perform the method according to claim 3, when the computer program is executed in a computing device.

13. A computer program embodied on a non-transitory computer readable medium and comprising computer executable computer program code, wherein the computer program code is configured to perform the method according to claim 4, when the computer program is executed in a computing device.

14. A computer program embodied on a non-transitory computer readable medium and comprising computer executable computer program code, wherein the computer program code is configured to perform the method according to claim 5, when the computer program is executed in a computing device.

15. An elevator and escalator peripheral device comprising:
at least one processor configured to execute computer program code;
at least one memory configured to store computer program code and related data; and
at least one network connection configured to connect the elevator peripheral device to a data communications network,
wherein the elevator peripheral device is configured to perform the method according to claim 2.

16. A transportation infrastructure control network element comprising:
at least one processor configured to execute computer program code;
at least one memory configured to store computer program code and related data; and
at least one network connection configured to connect the elevator peripheral device to a data communications network,
wherein the elevator peripheral device is configured to perform the method according to claim 4.

17. A transportation infrastructure control network element comprising:
at least one processor configured to execute computer program code;
at least one memory configured to store computer program code and related data; and
at least one network connection configured to connect the elevator peripheral device to a data communications network,
wherein the elevator peripheral device is configured to perform the method according to claim 5.

18. An elevator system comprising:
at least one elevator connected to a transportation infrastructure control network;
at least one elevator peripheral device according to claim 8, wherein the peripheral device is configured to transmit queries using a transportation infrastructure control network;
at least one network element, wherein the network element is configured to route data communications between the elevator peripheral device and a transportation infrastructure control network controller.

* * * * *